United States Patent
Sherman

(10) Patent No.: US 9,227,164 B2
(45) Date of Patent: Jan. 5, 2016

(54) DISPENSER FOR WATER TREATING AGENTS

(71) Applicant: Mark Sherman, Phoenix, AZ (US)

(72) Inventor: Mark Sherman, Phoenix, AZ (US)

(73) Assignee: FLOATRON INC, Phoenix, AZ (US)

( * ) Notice: Subject to any disclaimer, the term of this patent is extended or adjusted under 35 U.S.C. 154(b) by 203 days.

(21) Appl. No.: 13/714,086

(22) Filed: Dec. 13, 2012

(65) Prior Publication Data

US 2014/0170036 A1 Jun. 19, 2014

(51) Int. Cl.

| | |
|---|---|
| *B01F 3/12* | (2006.01) |
| *E04H 4/16* | (2006.01) |
| *B01F 13/00* | (2006.01) |
| *B01F 1/00* | (2006.01) |
| *C02F 1/68* | (2006.01) |
| *C02F 1/72* | (2006.01) |
| *C02F 1/76* | (2006.01) |
| *C02F 103/42* | (2006.01) |

(52) U.S. Cl.
CPC ............ *B01F 13/0049* (2013.01); *B01F 1/0016* (2013.01); *C02F 1/686* (2013.01); *C02F 1/688* (2013.01); *C02F 1/72* (2013.01); *C02F 1/76* (2013.01); *C02F 2103/42* (2013.01); *C02F 2303/04* (2013.01)

(58) Field of Classification Search
CPC .......................................................... B01F 3/12
USPC ..................... 422/265, 256; 210/242.1, 167.1
See application file for complete search history.

(56) References Cited

U.S. PATENT DOCUMENTS

| | | | |
|---|---|---|---|
| 429,384 | A | 6/1890 | Manwaring |
| 2,826,484 | A | 3/1958 | Buehler |
| 2,934,409 | A | 4/1960 | Biehl |
| 3,792,979 | A | 2/1974 | Clinton |
| 4,630,634 | A | 12/1986 | Sasaki et al. |
| 4,643,881 | A | 2/1987 | Alexander et al. |
| 4,692,314 | A | 9/1987 | Etani |
| 4,775,485 | A | 10/1988 | Etani |
| 4,880,547 | A * | 11/1989 | Etani ............................ 210/728 |
| 5,055,183 | A * | 10/1991 | Buchan ........................ 210/85 |
| 5,059,316 | A | 10/1991 | Renton |
| 5,433,867 | A | 7/1995 | Kisner |
| 5,795,551 | A | 8/1998 | Powell |
| 2005/0163684 | A1 | 7/2005 | Sherr |
| 2005/0244315 | A1* | 11/2005 | Greaves et al. ............... 422/264 |
| 2005/0279677 | A1 | 12/2005 | Lin |
| 2008/0217258 | A1 | 9/2008 | Buchan |
| 2014/0124456 | A1* | 5/2014 | King et al. .................... 210/753 |

* cited by examiner

*Primary Examiner* — Kevin Joyner
(74) *Attorney, Agent, or Firm* — Polster, Lieder, Woodruff & Lucchesi

(57) ABSTRACT

A dispenser for dispensing solid or liquid water-conditioning/treating agents into a body of water (such as a pool, hot tub, or the like) comprises a hollow body adapted to receive water treating agent which can be solid (tablet form), granular, powder or liquid. The dispenser has an overall specific gravity such that, when the dispenser is substantially empty of water-conditioning/treating agent(s), the dispenser will float, but when the dispenser contains water-conditioning/treating agents, the dispenser will sink.

12 Claims, 4 Drawing Sheets

DISPENSER FOR WATER TREATING AGENTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates to dispensers which dispense water conditioning or treating agents, such as sanitizing/disinfecting/purifying chemicals (i.e., chlorine, bromine, or non-chlorine oxidizers), water purifying microbes, algaecides or anti-microbial agents for virtually any body of water, such as, but not limited to, pools, ponds, hot tubs, and fountains and other water features. In particular the invention relates to a dispenser of water treating agents which will provide a notification when the dispenser needs to be refilled.

Oxidizers are commonly used to sanitize and disinfect water in bodies of water, such as noted above. Algaecides are used to rid a body of water of unwanted algae. These chemicals can be added to the water either as a liquid or as a solid. There are numerous types of dispensers for solid chemicals. However, these solid chemical dispensers are typically floating dispensers. Thus, they release the chemical near the surface of the water, resulting in a stratified layer at the bottom of the body of water where there is not much chemical. Further, such floating dispensers can interfere with, or get in the way of, people playing or swimming in the water. There are also solid chemical dispensers which rest on the bottom pool. However, dispensers at the bottom of the body of water are more difficult to retrieve to check the chemical level in the dispenser and more difficult to refill. In addition, there are dispensers wherein algaecide, supplied as a compressed solid, is placed in a pool skimmer. These, like the floating dispensers noted above, result in the pool water being stratified, with an upper layer containing the algaecide and a lower layer with not much algaecide.

It would be desirable to provide a dispenser which will sink to the bottom of the body of water when filled with water treating agent but which will then rise to the surface when the water treating agent is substantially depleted (i.e., when the dispenser is mostly empty of water treating agent).

BRIEF SUMMARY

Briefly stated, a dispenser is provided for dispensing solid water conditioning or treating chemicals or agents such as purifying, sanitizing or disinfecting chemicals (such as chlorine, bromine, and other non-chlorine oxidizers), algaecides into a body of water (such as a pool, hot tub, pond, water feature, etc.). Additionally, certain microbes engineered to replace chlorine and/or algaecides can be used in conjunction with, or in lieu of, chlorine or algaecides to condition or treat such bodies of water. The water treating agent, if in solid form, can be in a compressed or tableted form or can be in a granular or powder form. If microbes are used in conjunction with chlorine, the dispenser can be provided with both chlorine and microbe tablets. If compressed or tableted, the water treating agent can be provided in most any desired 3-dimensional shape, including spheroid, cylindrical, prismatic, etc. If the water treating agent (whether chlorine, bromine, microbe, zinc, algaecide, etc.) is provided in granular or powder form, the chemical can be provided in a slow release format. The overall specific gravity of the dispenser is less than 1 when the dispenser is mostly empty of water treating agent, such that the dispenser will float. When provided with water treating agent, the overall specific gravity of the filled dispenser is greater than 1, so that the dispenser will sink to the bottom of the body of water.

The dispenser comprises a first part and a second part which are removably connectable together. The dispenser is shaped such that it can roll on the bottom of the body of water. Thus, the dispenser can be cylindrical or spherical or even torroidal. If spherical, the first and second parts, when connected, define a hollow generally spherical unit. In an illustrative embodiment, the first and second parts of the dispenser each comprise a wall defining a segment of a sphere which terminates in an edge. The wall of at least one of the dispenser parts has openings formed therein to allow water to enter the unit. At least one of the first and second parts has a locating member which locates the water treating agent within the unit such that the water treating agent is spaced from the wall of the dispenser.

Illustratively, the locating member can comprise supporting members which define a platform that supports the water treating agent axially within the dispenser, and a plurality of positioning members which maintain the radial position of the water treating agent within the dispenser. The supporting and positioning members effectively define a space (which can be cylindrical) sized to receive the water treating agent. Preferably, the circumference defined by the positioning members is slightly larger than a standard size of a chlorine or bromine tablet or stick. The supporting and positioning members can be defined by internal ribs or tabs. The internal ribs of the first and second parts are positioned in the first and second parts such that their inner edges are parallel to each other and that the circle defined by the tabs of the first part are coaxial with the circle defined by the tabs of the second part.

The dispenser can also include a container or canister sized to be received by the locating member within the space defined by the first and second parts. The container can receive solid water treating agents in granular, powder and/or tablet form. The container has a mesh, perforated or otherwise porous wall to enable water to pass through the container wall to contact and dissolve the solid water treating agent. Alternatively, the water treating agent can be in a liquid form. In this instance, the container will have correspondingly smaller perforations to facilitate a slow release of the agent into the water which enters the container. The container can also include a bottom, in which case, the top of the container is defined by one of the first and second parts of the unit. Alternatively, the container can include both a top and a bottom, in which case, the container top is openable or removable.

BRIEF DESCRIPTION OF THE SEVERAL VIEWS OF THE DRAWINGS

Corresponding reference numerals will be used throughout the several figures of the drawings.

DETAILED DESCRIPTION

Figure 1:
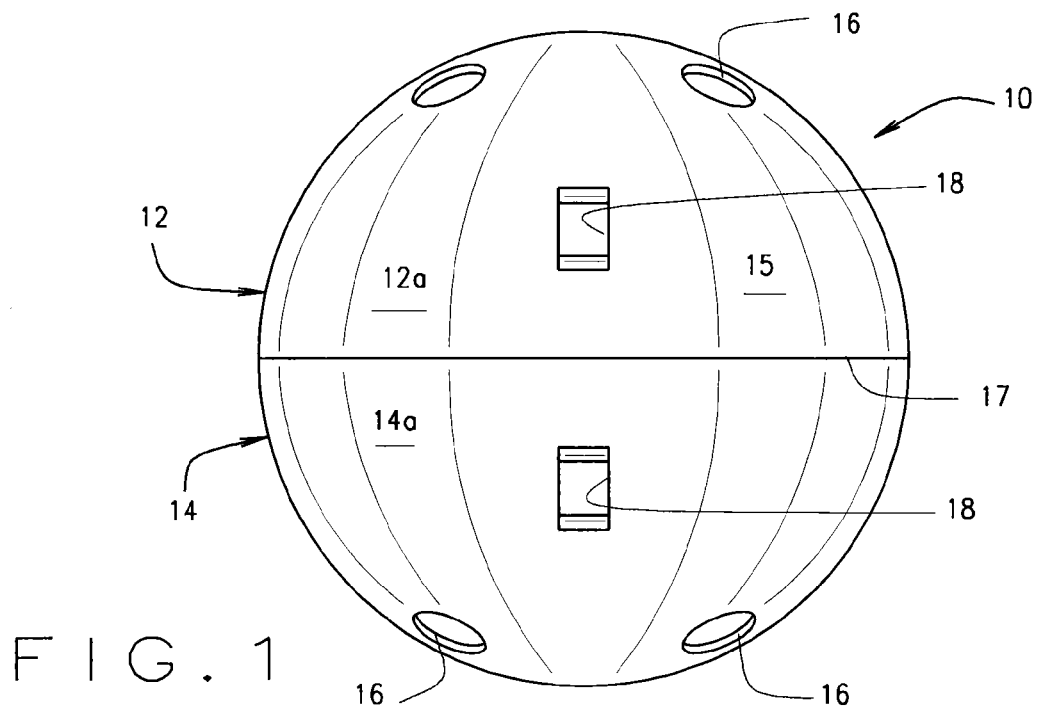
FIG. 1 is a perspective view of a dispenser for water treating agents in a closed or assembled condition.

The following detailed description illustrates the invention by way of example and not by way of claimed limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
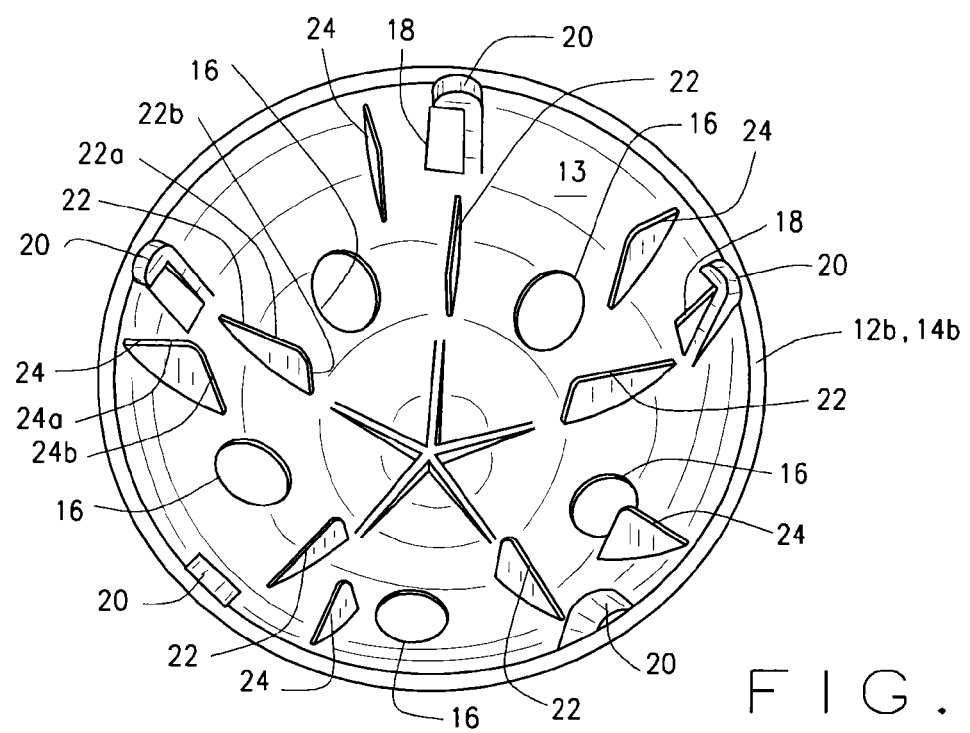
FIG. 2 is a perspective view of one part of the dispenser, the dispenser being comprised of two identical parts.

An illustrative embodiment of a dispenser 10 for dispensing water treating agents is shown generally in the figures. The dispenser 10 is shown to be in the shape of a hollow sphere and is comprised of two semi-spherical parts 12 and 14. Although shown to be spherical, it will be evident that the dispenser 10 can be formed in other shapes, such as cylindrical, torroidal, or oblate. The two parts 12 and 14 are identical, and hence will not be described separately. Although the two parts 12 and 14 are shown to be hemispherical, one part can define a segment of a sphere larger than the other part. The parts 12 and 14 are defined by walls 12*a* and 14*a*, respectively, having an inner surface 13 and an outer surface 15. The two parts 12 and 14 have an edge 12*b*, 14*b*. As seen in FIG. 2, the edge 12*b*, 14*b* defines a circle. When the two parts 12, 14 are connected together the edges 12*b* and 14*b* abut each other. In the illustrative example shown, the two edges 12*b*,14*b* form an equator 17 on the assembled dispenser 10. As can be appreciated, if the two parts 12, 14 define different sized segments of a sphere, the edges 12*a*, 14*a* will still define a circle about the assembled dispenser, but the circle will not be an equator.

Figure 3:
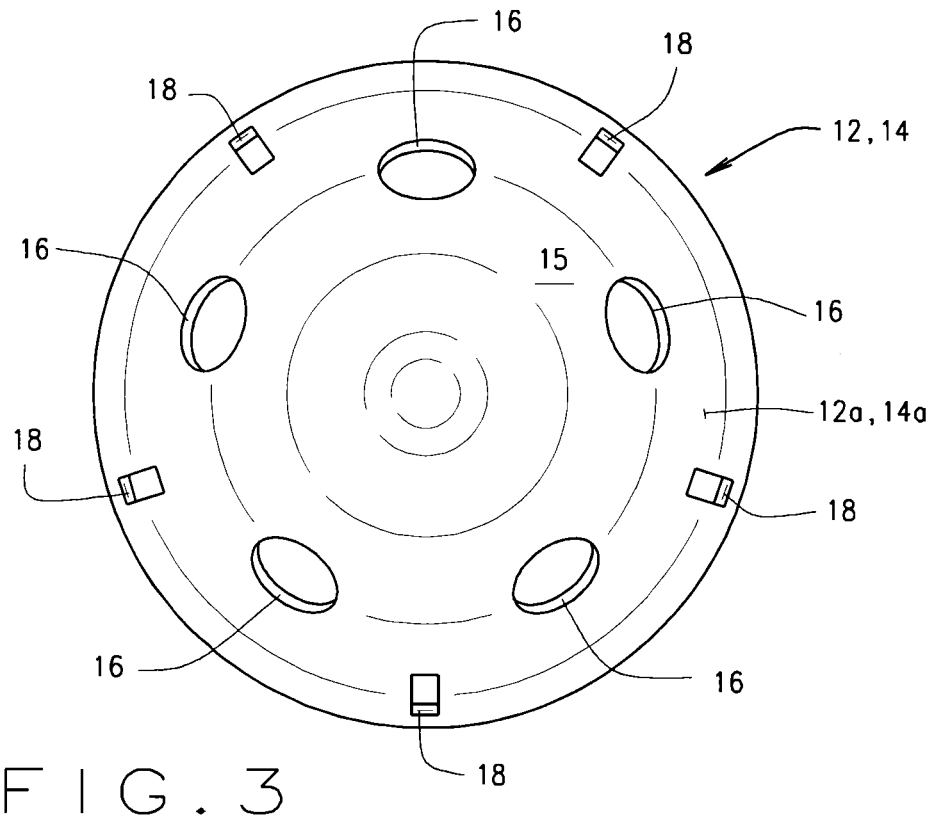
FIG. 3 is a perspective view of the exterior of the part of the dispenser.

The walls 12*a*, 14*a* of each part 12, 14 have a plurality of holes 16 which extend through the walls 12*a*, 14*a*. The holes 16 are shown to be circular, but could be any desired shape. In addition, the parts 12, 14 include elongate holes 18 which also extend through the walls 12*a*, 14*a*. These holes 18 can be rectangular or oval (or any other desired shape). As best seen if FIGS. 2-4, the holes 18 are positioned closer to the edges 12*b*, 14*b*, and the holes 16 are closer to the center or top/bottom of the semi-spherical walls 12*a*, 14*a*. The holes 16 and 18 place the exterior of the dispenser in communication with the interior of the dispenser, to allow water to flow into and through the dispenser. The holes 16, 18 are sized and positioned so that when the dispenser is provided with a water treating agent, it will sink quickly. That is, the position of the holes 16, 18 will minimize, if not eliminate, the trapping of air within the dispenser 10, thereby facilitating the sinking of the dispenser and reducing the potential of the dispenser to float on the water surface when a user places water treating agent in the dispenser and places the dispenser in the water. Although shown with holes or perforations, the walls 12*a*, 14*a* could be made of a mesh. Further, although the parts 12, 14 are shown with five holes 16 and five holes 18, more or fewer holes can be provided, as may be desired. Additionally, the size and shape of the holes can be varied. The number and size of the holes should be sufficient, as noted above, to enable water to quickly enter the dispenser 10 so that that a dispenser filled with water treating agent will sink fairly quickly.

Figure 5:
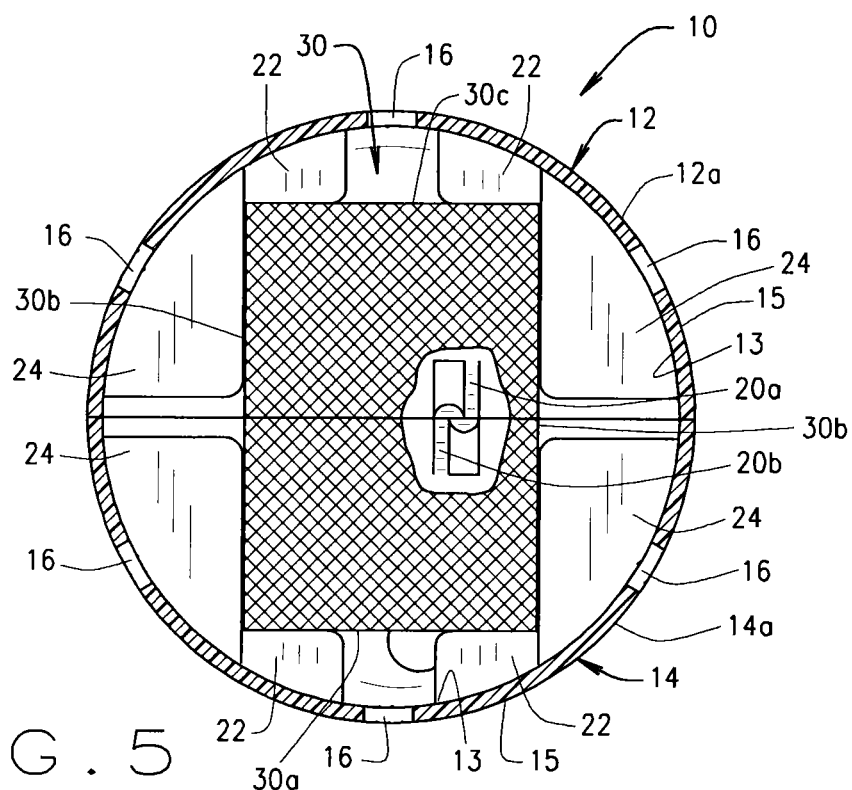
FIG. 5 is a schematic cross-sectional view of the water treating agent dispenser with the canister received therein which accepts tableted, granulated or powdered solid water treating agent, the canister being cut away to show the connection between the two parts.

The two parts 12 and 14 are removably connected together. As seen in FIGS. 2 and 5, the parts 12 and 14 each include generally J-shaped hooks 20. The hooks 20 have a stem portion which extends along the inner surface 13 of the walls 12*a*, 14*a* and then extend beyond the edge 12*b*, 14*b* of the respective part, such that the curvature of the hook end of the J-shaped hook is exposed beyond the edge 12*b*, 14*b*. The hook 20 turns back toward the edge 12*b*,14*b* (as best seen in FIG. 5*b*) and the end of the hook finger extends to a point slightly below the level of the edge 12*b*,14*b* to be adjacent the inner surface of the wall 12, 14. Five hooks 20 are shown on each part 12, 14. There can be more hooks or fewer hooks, as may be desired. However, the parts 12, 14 each have at least two hooks, and preferably at least three hooks. The hooks 20 are sized and shaped such that when the two parts 12 and 14 are assembled together, the hooks 20 of the two parts face each other. The two parts are held together by the nesting of the hooks 20 as illustratively shown in FIG. 5. The hook fingers are sufficiently flexible such that when the upper and lower parts 12,14 are placed in an abutting relationship and then twisted relative to each other, the hooks 20 of the two parts will engage (to connect the two parts together) or disengage (to separate the two parts). To prevent accidental separation of the two parts, a modicum of force is required to separate the two parts 12, 14. As shown schematically in FIG. 5, the ends of the J-hooks 20 are rounded. This rounded shape facilitates the engagement (and separation) of the hooks when the two parts are twisted to nest or separate the hooks. Hence, the engagement of the hooks is a type of interference fit.

Although the two parts 12, 14 of the unit are shown to be connected by interconnecting, nesting or meshing hooks 20, the two parts can be connected together in other ways as well. For example, the parts can be provided with overlapping threaded surfaces which allow the parts 12, 14 to be screwed together. A bayonet-type slot in one of the two parts can accept a projection in the other of the two parts, to form another twist-type connection. A rib and groove (or ball and detent) connection can also be used. As another alternative, the two parts can be magnetically connected, for example, by magnets proximate the edges 12*b*, 14*b* of the two parts. As can be appreciated, the two parts can be removably connected together using any desired mechanism or means.

Internally, the parts 12 and 14 are provided with locating means comprised of axial positioning ribs 22 and radial positioning ribs 24. The ribs 22 and 24 each have an end edge 22*a*, 24*a* that is generally parallel with a plane defined by the wall edge 12*b*, 14*b* and an inner edge 22*b*, 24*b* that is generally perpendicular to the plane defined by the wall edge 12*b*, 14*b*. A back edge of the ribs 22 and 24 is defined by the inner surface 13 of the walls 12*a*, 14*a*. Hence, the ribs 22 and 24 are generally in the shape of a segment of a circle with the inner and end edges of the ribs defining an overall generally L-shaped edge. The axial positioning ribs 22 are shorter than the radial positioning ribs 24. As seen in the Figures, the end edge 24*a* of the radial positioning ribs 24 is generally flush with the edge 12a,14a of the respective part 12, 14, and the end edge 22a of the axial positioning ribs 22 is spaced axially from the edge 12a, 14a.

Figure 4A:
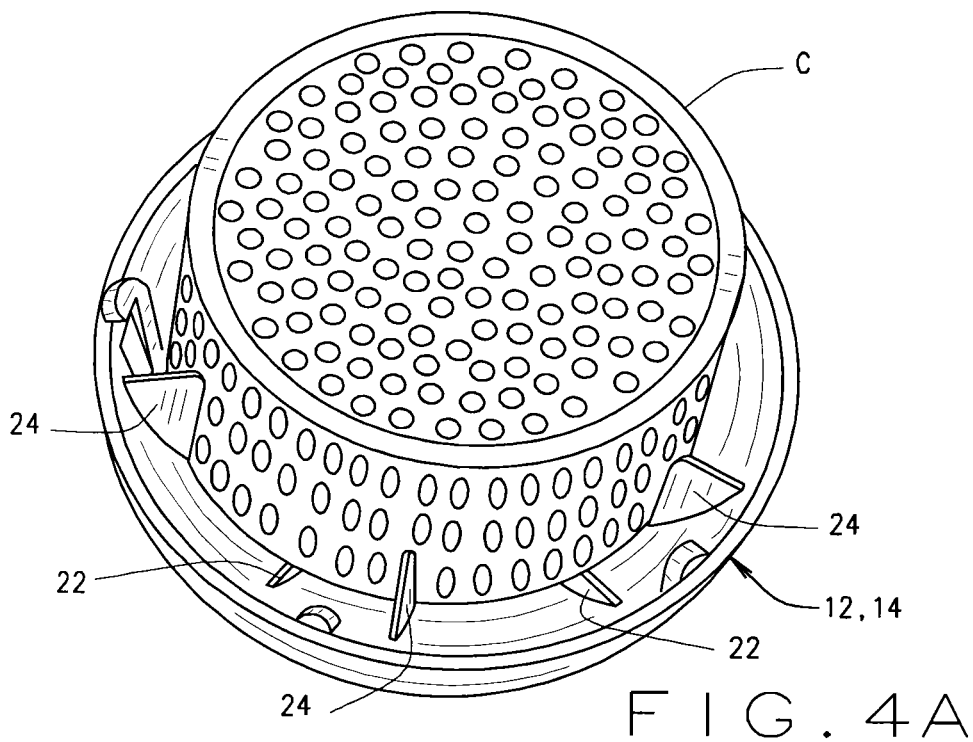
FIGS. 4a and 4b are perspective views of a part of the dispenser with a canister positioned in the dispense to hold water treating agents.
Figure 4B:
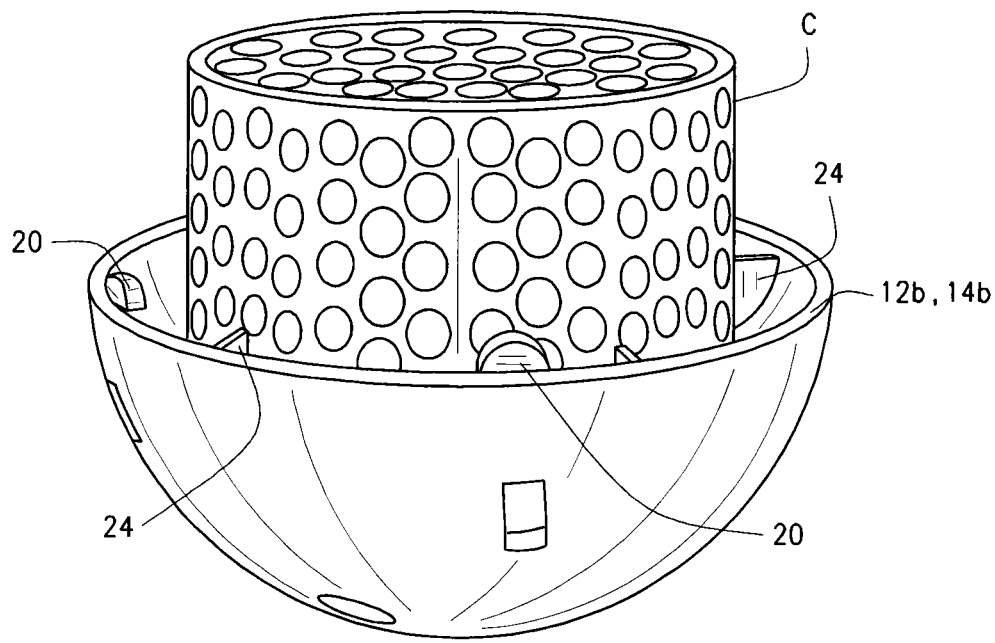

The axial positioning ribs 22 define axially positioning members that support the water treating agent C axially in the dispenser 10 as illustratively shown in FIGS. 4a and 4b. As shown schematically in FIG. 5, the opposed axial ribs 22 of the two parts 12 and 14 will confine the water treating agent C (which is in a columnar shape) to a determined axial area of the dispenser. As discussed below, the axial ribs 22 space the water treating agent from the "top" and "bottom" of the dispenser 10, and the radial ribs space the water treating agent from the "side" of the dispenser 10.

The inner edge of the radial positioning ribs 24 define a circle that is larger than the circle defined by the inner edge of the axial positioning ribs 22. The circle defined by the radial positioning ribs 24 is sized to receive commercially available water treating agent tablets or bars/rods/sticks. Commercially available water treating agent tablets and rods can be 1"-3" in diameter. When the water treating agent is received in the dispenser 10, the ribs 24 position the water treating agent radially within the dispenser. The radial positioning ribs 24 are sized and positioned to confine the water treating agent within a defined radial area of the dispenser, and to maintain the water treating agent spaced from the "side" of the dispenser.

Figure 6:
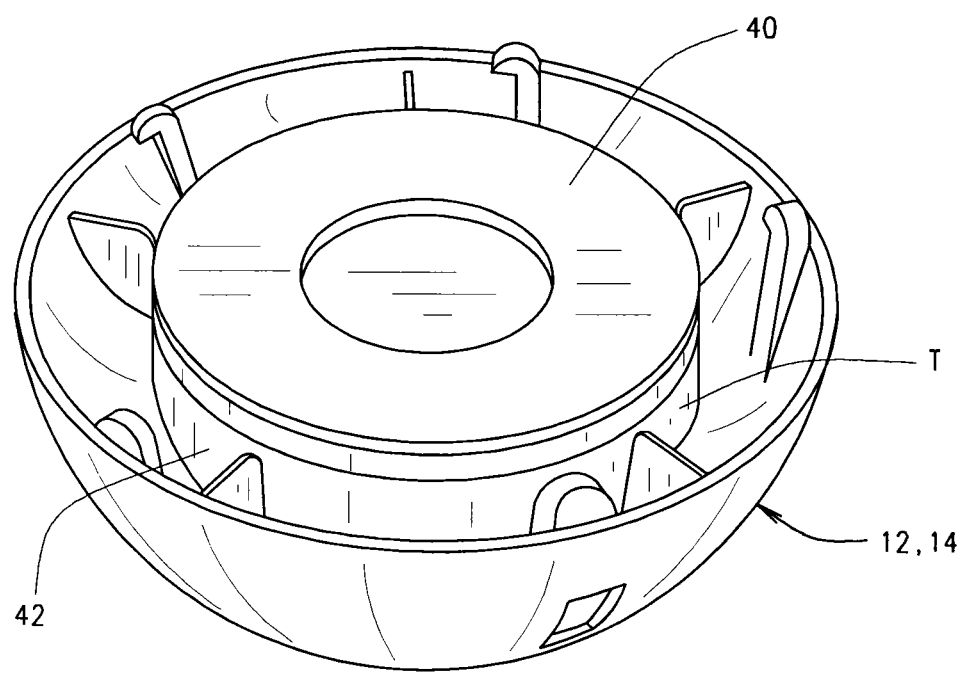
FIG. 6 is a perspective view of a part of the dispenser with mineral (i.e., zinc, copper, tin, etc.) and chlorine tablets to form a mineral chloride in the body of water which will act as an algaecide.

The water treating agent C can be provided in a columnar form, as generally seen in FIG. 6. The water treating agent can be in the form of a tablet T, in which case the water treating agent column is comprised of one or more stacked tablet(s). Alternatively, the water treating agent can be in the form of a bar or stick, in which case, the bar or stick forms the water treating agent column. However, the water treating agent can be provided in any other desired 3-dimensional solid shape, i.e., prismatic, conical, spheroid, etc. Alternatively, as described below, the water treating agent can be in granular or powder form, in which case, it is held in a canister or container, and the overall shape is defined by the water treating agent containing canister. As a further alternative, the water treating agent can be provided in a liquid form. The liquid water treating agent can be contained in a bag or pouch. The bag or pouch has pores sized to allow the liquid water treating agent to pass through the bag slowly, so that the agent will become entrained in the body of water over a period of time. Stated differently, the pores of the bag or pouch will need to be sized such that the liquid water treating agent will be released slowly over time into the body of water. The axial positioning ribs 22 and radial positioning ribs 24 position the water treating agent mass such that the solid water treating agent is spaced from the inner surface 13 of the dispenser 10. This allows water to flow around all surfaces of the water treating agent. Further, the sizing and number of radial ribs 24 will substantially keep the water treating agent (if in a 3-dimensional solid shape, i.e., tablet, rod, sphere, prism, or bar form) contained within the area defined by the radial ribs 24, even as the water treating agent dissolves and is released into the water. By keeping the water treating agent spaced from the inner surface 13 of the dispenser, when the dispenser comes into contact with a surface (i.e., bottom or side) of the body of water (e.g., a bottom or side wall of a pool) the water treating agent will be spaced from the surface and will be less likely to stain, bleach, discolor or otherwise blemish the surfaces of the body of water.

Turning to FIG. 5, the unit can be provided with an internal canister or container 30 which can be filled with either powder or granules of water treating agent, or larger masses (such as tablets or bars) of water treating agent. The container 30 has a bottom 30a, side walls 30b and a top 30c. The top 30c is removable or otherwise openable to enable the container 30 to be filled with chlorine granules. The container 30 is porous so that water can pass through the container. The container thus has mesh walls or perforated walls, as well as a mesh or perforated top and bottom. The mesh or perforations are sized to be smaller than the size of the water treating agent granules, so that the granules will be contained within the container 30, even as they dissolve. Although shown to be generally cylindrical, the container 30 can be provided in any other desired three-dimensional shape. If the perforations are small enough, the container can receive water treating agent in liquid form (i.e., the liquid water treating agent can be poured directly into the container). Here, the perforations (or pores) would need to be small enough to ensure that the liquid water treating agent will enter the body of water over a period of time. Stated differently, the pores will need to be sized such that the liquid water treating agent will be released slowly over time into the body of water.

The dispenser 10 when mostly or substantially empty of water treating agent has an overall specific gravity or density less than the specific gravity or density of water, such that the dispenser 10 with only a small amount of water treating agent is lighter than water and will float in the body of water. Additionally, the dispenser 10 when combined with the container 30 also has an overall specific gravity or density less than the specific gravity or density of water, such that it will float in the body of water. However, the specific gravity/density of the dispenser is such that, when provided with solid or liquid water treating agent, the unit will sink to the bottom of the pool. So that the dispenser 10 is lighter than water, the dispenser 10 (and the container 30) are made from materials that are lighter (less dense) than water. The dispenser 10 can be molded from a plastic that has a density less than that of water. The plastic can be a solid plastic. Alternatively, the dispenser 10 can be formed from a material which defines voids or air pockets. As such, the material can be a rigid, closed-cell foam. As another alternative, the dispenser can be provided with one or more air sacs. This would allow the dispenser to be made from a material, such as a metal, which would otherwise produce a dispenser with an overall specific gravity that is greater than 1 (and would thus not float). The air sacs would be sized such that the dispenser will sink when provided with water treating agent, but will float when the water treating agent is substantially depleted. Chlorine tablets, for example, can have a bulk density of between about 1.16 to a density of greater than 2.3 g/cc. The specific gravity of granules, however, can be closer to the specific gravity of water. Hence, so that the overall or average density of the dispenser 10 when filled with granules is greater than the density of water, the density of the dispenser 10, when empty, is slightly less than the density of water. As noted below, some pools have salt added to the water, so that the pool is a salt water pool. The water in salted pools has a lower specific gravity than pure fresh water pools/bodies of water. The specific gravity (or density) of the material from which the dispenser is formed can be adjusted so that the dispenser 10 will operate as intended in a salted pool/body of water.

Thus, when the dispenser 10 is provided with water treating agent (in larger solid shapes (such as tablets, rods or sticks), as powder or granules, or in liquid form), the dispenser 10 will sink to the bottom of the pool. As noted above, the holes 16 and 18 are sized and positioned to substantially reduce the possibility of trapping air. Thus, the dispenser will not float on the surface of the water for any appreciable period of time, but rather will begin to sink promptly and will come to rest at the bottom of the body of water. As the water treating agent dissolves, the overall effective specific gravity of the water treating agent-filled dispenser is reduced, such that the dispenser will become buoyant, and will ultimately rise to the surface of the water where it will float and be visible. When the dispenser rises to the surface of the water, it is time to refill the dispenser with water treating agent. Hence, the dispenser itself provides an indication of when it is necessary to refill the dispenser. As can be appreciated, this eliminates the need to physically check the dispenser 10 (i.e., open up the unit 10) to determine the amount of water treating agent remaining in the dispenser 10.

As can be appreciated, with the dispenser 10 at the bottom of the body of water, the water conditioning/treating chemical will dissolve (or otherwise enter the water of the body of water and be released at the bottom of the body of water. With the spherical dispenser at the bottom of the body of water, the dispenser will be free to roll around, thus enabling the water conditioning/treating agent to be released, dispersed or dissolved in different areas of the body of water, as it is moved around. Further, because the dispenser 10 is spherical, oblate, torroidal or cylindrical, the dispenser 10 can be moved by vacuums which are commonly used in pools.

It is expected that the dispenser will primarily be used with water treating agents, such as chlorine, bromine, or non-chlorine oxidizers, to sanitize/disinfect fresh water pools. Additionally, as noted, the dispenser can be used with a liquid water treating agent. However, some pools have salt (NaCl) added to the water. Such pools often require algaecides to maintain the pool water. To this extend, a tableted mineral sulfate (such as copper, zinc, or tin sulfate) could be placed in the dispenser 10, and the dispenser would be used and would operate as described above. Alternatively, a metallic plate could be combined with a chlorine tablet, as shown in FIG. 6. The metallic plate comprises an element which will react with the chlorine. Thus, the metallic plate can comprise zinc, a zinc alloy, copper, a copper alloy, silver or a silver alloy, or tin or a tin alloy. The plate 40 is shown to be annular. The plate 40 could define a solid circle (or other shape). Alternatively, the plate 40 can be perforated to increase the surface area of the plate to thereby facilitate reaction of the plate with the chlorine. As shown in FIG. 6, a plate 40 is positioned on top of a chlorine tablet 42. Alternatively, the plate 40 can be sandwiched between two chlorine tablets 42. The element of the plate 40 would react with the chlorine of the chlorine tablet 42 to form a metal chloride (i.e., a zinc chloride, a copper chloride, a silver chloride, or a tin chloride, etc.), which has algaecidal properties. In FIG. 6, the plate 40 is shown to be in contact with the tablet 42. The plate 40 need not be in actual contact with the tablet 42. However, the plate should be in close proximity to the tablet 42 so that dissolved chlorine can contact the plate to react with the plate to form the metal chloride. Although chloride is noted, the tablet could contain any ion which can combine with a metal to form a metal salt having algaecidal properties. Alternatively, the metal could be provided in a granular or powdered state. Such a granular or powdered metal could be placed in the canister 30. The metal would then react with the chlorine which is already present in the salt water to form the noted metal chloride. In pools that use readily available saltwater, the saltwater will not have any free chlorine per se. In this instance, free chlorine is can be generated by electrolysis in a "salt cell" which splits NaCl into sodium and chlorine ions, or by addition of chlorine/oxidizer by conventional means. In another alternative, the canister 30 can be filled with both granular or powdered metal and granular or powdered chlorine. If the powdered or granular chlorine is used, the metal plate 40 can simply be placed in the canister 30. Alternatively, the metal plate can be positioned externally of the canister, but within the dispenser 10.

In a variation, the dispenser can be suspended from a float or floating object or from a ladder at the side of a pool, etc. The dispenser can be suspended by a flexible cord (such as a string, chain, wire, etc.) so that it does not contact the bottom of the pool or body of water. This can be beneficial, for example, in pools, hot tubs, etc. which have coloring in either the plaster or the vinyl liner, inasmuch as the agents contained in the dispenser can bleach out an area of color. If the dispenser is suspended, the cord would be of a length to suspend the dispenser a below the water surface a sufficient distance. For example, the dispenser would be at least one foot below the surface of the water, and preferably two or more feet below the surface of the water. The cord, as noted, is flexible, so that the dispenser will rise to the surface of the water when it is substantially empty.

As various changes could be made in the above constructions without departing from the scope of the claimed invention, it is intended that all matter contained in the above description or shown in the accompanying drawings shall be interpreted as illustrative and not in a limiting sense. For example, although the dispenser 10 is shown and described as being spherical, the dispenser could be cylindrical, torroidal, or oblate. This would still allow for the dispenser 10 to roll about the bottom of body of water and to be moved by, for example, pool vacuums. The positioning ribs 22, 24 could be replaced with other elements which would accomplish the same function. For example, the ribs 24 could be replaced with columns which extend generally perpendicular to the plane defined by the edges 12a, 14a. These columns would then define a cage which receives the water treating agent. Alternatively, the columns could be replaced by fingers which extend generally parallel to the plane defined by the edges 12a, 14a. The ribs 22 could be replaced by a perforated platform which would allow water to contact the axial ends of the water treating agent column. These examples are merely illustrative.

The invention claimed is:

1. A water treating agent dispenser for dispensing solid or liquid water-conditioning/treating agents into a body of water; the dispenser comprising a hollow body; having an overall specific gravity such that, when said hollow body is substantially empty of water-conditioning/treating agent(s), the hollow body will float, but when the hollow body contains water-conditioning/treating agents, the hollow body will sink; said hollow body comprising:
   an inner surface and an outer surface;
   a plurality of openings formed in said body; said openings extending from said outer surface to said inner surface to place an interior of said body in communication with an exterior of said body; and
   an axial positioner and a radial positioner; said axial and radial positioners extending from said inner surface of said body and being sized, shaped and positioned to maintain the water treating agent within the body, to position the solid water treating agent spaced from the inner surface of said body, and to allow water to contact all sides of said water treating agent; wherein,
   (a) said axial positioner comprises a plurality of ribs extending from said inner surface of said body; said axial positioner ribs having an axially extending edge which is generally parallel to said axis of said body; and
   (b) said radial positioner defines a support surface which is generally perpendicular to said axis and is spaced from said inner surface of said body; said support surface being shaped to allow water to contact ends of said solid water treating agent.

2. The water treating agent dispenser of claim 1 wherein said openings are sized and positioned to substantially prevent formation of air pockets as said dispenser sinks.

3. The water treating agent dispenser of claim 1 wherein said openings are sized to enable water to flow freely through said body.

4. The water treating agent dispenser of claim 1 wherein said outer surface of said body is generally circular in cross-section.

5. The water treating agent dispenser of claim 1 wherein said body comprises a first part and a second part; said first and second parts being removably connectable together; whereby the dispenser can be selectively switched between an open position in which the first and second parts are disconnected to enable filling or refilling of the dispenser, and a closed position in which the first and second parts are connected together for use in the body of water.

6. The water treating agent dispenser of claim 1 wherein said radial positioner comprises a plurality of upper ribs and a plurality of lower ribs; said upper and lower ribs each having a radial edge which extends generally perpendicular to said axis.

7. The water treating agent dispenser of claim 1 wherein said axial positioner comprises a sufficient number of ribs, and said ribs being sized and shaped, such that said ribs will axially contain the water treating agent as it is depleted.

8. The water treating agent dispenser of claim 1 including a canister sized to be received within said body; said canister having a mesh, perforated, or otherwise porous wall; said canister being sized to accept water treating agent in granular form, or tablet form, or liquid form.

9. The water treating agent dispenser of claim 8 wherein, when said agent is in liquid form, said canister defines pores sized to release the liquid agent into a body of water slowly over time.

10. The water treating agent dispenser of claim 8 wherein said canister comprises one of a top and a bottom.

11. The water treating agent dispenser of claim 9 wherein said canister comprises both a top and a bottom; said container top being openable or removable.

12. The water treating agent dispenser of claim 1 wherein said body is generally spherical.

* * * * *